United States Patent
Martinez (10) Patent No.: US 10,284,410 B1
(45) Date of Patent: May 7, 2019

(54) SIGNAL COMMUNICATION WITH DECODING WINDOW

(71) Applicant: NXP B.V., Eindhoven (NL)

(72) Inventor: Vincent Pierre Martinez, Roques (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/114,665

(22) Filed: Aug. 28, 2018

(30) Foreign Application Priority Data

Jul. 5, 2018 (EP) .................................. 18305885

(51) Int. Cl.
| | | |
|---|---|---|
| *H04K 1/10* | (2006.01) | |
| *H04L 27/26* | (2006.01) | |
| *G06F 17/14* | (2006.01) | |
| *H04L 5/00* | (2006.01) | |
| *H04L 27/00* | (2006.01) | |

(52) U.S. Cl.
CPC ........ *H04L 27/2665* (2013.01); *G06F 17/142* (2013.01); *H04L 5/0007* (2013.01); *H04L 27/0014* (2013.01); *H04L 2027/0026* (2013.01)

(58) Field of Classification Search
CPC ............. H04L 27/2665; H04L 27/0014; H04L 5/0007; H04L 2027/0026; G06F 17/142
USPC ........ 370/203, 204, 208, 209; 375/222, 257, 375/260, 341, 348, 316, 295, 344, 232, 375/203; 455/277.1, 436
See application file for complete search history.

(56) References Cited

U.S. PATENT DOCUMENTS

| | | | |
|---|---|---|---|
| 2006/0153317 A1* | 7/2006 | Zhang | ............... H04L 25/03159 375/344 |
| 2006/0166634 A1* | 7/2006 | Ido | ........................ H04B 7/0808 455/277.1 |
| 2008/0112518 A1 | 5/2008 | Wilhelmsson | |
| 2010/0080112 A1 | 4/2010 | Bertrand et al. | |
| 2016/0359656 A1* | 12/2016 | Alloulah | ............. H04L 27/2665 |
| 2017/0086153 A1 | 3/2017 | Yoon et al. | |
| 2017/0163457 A1* | 6/2017 | Futatsugi | ................. H04B 1/16 |

FOREIGN PATENT DOCUMENTS

| | | |
|---|---|---|
| WO | 2016209197 A1 | 12/2016 |
| WO | 2017026983 A1 | 2/2017 |

* cited by examiner

*Primary Examiner* — Dhaval V Patel (57) ABSTRACT

Aspects of the present disclosure are directed to processing signals received from different sources, such as may be relevant to receiving signals having respective time-offsets based upon a distance via which the respective signals travel, and/or due to an oscillator clock mismatch. As may be implemented in accordance with one or more embodiments, respective fast Fourier transform (FFT) series are generated for symbols in respective ones of communications received in parallel. For each message that the receiver is trying to decode, channel estimation is performed on the respective FFT series, and one of the FFT series is selected based upon metrics indicative of interference in the respective FFT series, for that particular message. A decoding timing window is set based on the selected FFT series, and the selected FFT series is decoded.

17 Claims, 5 Drawing Sheets

SIGNAL COMMUNICATION WITH DECODING WINDOW

OVERVIEW

The present disclosure relates to orthogonal frequency division multiplexing (OFDM), and more particularly to the selective processing of OFDM signals from respective sources.

In various communication systems, synchronization and timing can be important to ensure that communications are received and decoded accurately. This is relevant for a variety of different types of communication systems. For instance, in synchronous systems (e.g., $3^{rd}$ Generation Partnership Project (3GPP) Vehicle to Everything (V2X)) in nature is a synchronous system, meaning that all users are assumed to be synchronized on a common reference timing. However, achieving such timing can be challenging.

In synchronous systems, transmitters may align their messages with Global Navigation Satellite System (GNSS) timing. In such OFDM systems, receivers may position their receiving fast Fourier transform (FFT) windows based on the GNSS timing, however timing mismatches can occur. As such, certain approaches such as those involving a Cyclic Prefix (CP) can be used to avoid inter-symbol-interference (ISI). For instance, the end of an orthogonal frequency division multiplexing (OFDM) symbol IQ samples and appends the CP at the beginning, to absorb delays. However, when propagation delays extend beyond the CP duration, interference may occur. Receiving messages under conditions in which the transmitter to receiver distance is large becomes even more challenging.

These and other matters have presented challenges to efficacy and efficiencies of signal communications, for a variety of applications.

SUMMARY

Various example embodiments are directed to issues such as those addressed above and/or others which may become apparent from the following disclosure concerning the selection of signals for processing from disparate sources. In various specific aspects, signals are selected and processed from respective sources, facilitating the accurate reception of signals from disparate sources utilizing a common clock.

In certain example embodiments, aspects of the present disclosure involve selecting a signal for processing and adjusting a related FFT timing window for processing the signal, relative to other received signals that may be skewed in timing. Such an approach may be particularly applicable to selecting one of two or more signals that emanate from different sources at different distances and/or may involve an original and reflected signal from a common source (the reflected signal being delayed).

In a more specific example embodiment, an apparatus includes an antenna circuit configured and arranged to receive communications in parallel from a plurality of sources, and an orthogonal frequency-division multiplexing (OFDM) receiver circuit configured and arranged to generate respective fast Fourier transform (FFT) series for symbols in respective ones of the received communications. The OFDM circuit is further configured and arranged to perform channel estimation for first and second ones of the FFT series, select one of the first and second FFT series based upon metrics indicative of interference in the first and second ones of the FFT series, set a decoding timing window based on the selected FFT series, and decode the selected FFT series, with a result of the decoding being output.

In another specific example embodiment, a method is carried out as follows. For communications received in parallel from a plurality of sources, respective fast Fourier transform (FFT) series are generated for symbols in respective ones of the received communications, and channel estimation is performed for first and second ones of the FFT series. One of the first and second FFT series is selected based upon metrics indicative of interference in the first and second ones of the FFT series. A decoding timing window is set based on the selected FFT series and used to decode the selected FFT series, with a result of the decoding being output.

In accordance with another embodiment, an apparatus includes respective FFT circuits, each configured and arranged to generate respective fast Fourier transform (FFT) series for symbols in respective ones of received communications. The apparatus further includes respective channel estimation circuits, each configured and arranged to provide channel estimation data for an FFT series received from one of the FFT circuits. Gating circuitry is configured and arranged to select one of the respective FFT series based on metrics received from the respective channel estimation circuits, and timing circuitry is configured and arranged to set a decoding timing window based on the selected one of the respective FFT series.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIGS. 1A and 1B make up a system-level diagram illustrating example circuitry and a related approach for selecting a signal upon which signal processing is based, in which FIG. 1A shows circuitry for selecting and processing of one of two or more received signals through an equalizer, and in which FIG. 1B shows further processing of the selected signal, in accordance with the present disclosure;

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving the selection and processing of signals, such as may be implemented for adjusting time windows for processing delayed signals generated using a synchronized and/or common clock. In certain implementations, aspects of the present disclosure have been shown to be beneficial when used in the context of V2X communications in which respective transmitters located at different distances from a receiver operate on a common clock synchronization, with the respective signals being received at different time offsets due to distance. Such aspects are also beneficial in situations in which reflected V2X signals received from a common source, which may be due to reflections off of structures such as buildings. In some embodiments, characteristics of respective signals are used to align reception of a particular signal to a time window offset, relative to a common clock synchronization, to facilitate accurate reception of one of the signals. These approaches may, for example, address challenges such as those characterized in the overview section herein. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various embodiments are directed to implementation with a variety of types of communication networks, such as networks involving a cooperative type environment in which respective communication nodes communicate with one another. In one such embodiment, communication nodes autonomously and co-operatively select their resources, without necessarily employing a master node or base station, according to decentralized congestion control (DCC) schemes. For instance, Long Term Evolution Vehicle to Everything (LTE-V2X) "mode 4" is an example of a cooperative configuration. LTE-V2X may be implemented as part of the Intelligent Transport Systems (ITS) system. In such networks, a common clock for (e.g., Sidelink) users may be extracted from a Global Navigation Satellite System (GNSS) signal. Additionally, such users can periodically send synchronization subframes such that surrounding users who are not able to receive GNSS signals can still get a reference clock.

Certain embodiments may relate to the 3GPP Sidelink Rel-14 and Rel-15 standards, such as "mode 3" and "mode 4" that are designed for V2X applications, and their implementation in a mobile environment (for example an automobile, motorcycle, bicycle, a train, a pedestrian handset or an emergency vehicle). In addition to LTE-V2X, various other Orthogonal Frequency Division Multiplexing (OFDM) standards such as 5G can be utilized in this context. In various contexts, OFDM can refer to the family of OFDM waveforms, and may involve OFDM (e.g., IEEE 802.11p), orthogonal frequency-division-multiple-access (OFDMA) (e.g., LTE downlink), or single-carrier frequency-division-multiple-access (SC-FDMA) (e.g., LTE Uplink or LTE Sidelink). Various embodiments may relate to the decoding of one or more of a Physical Sidelink Broadcast Channel (PSBCH or BCH), Physical Sidelink Shared Channel (PSSCH) for data signals and the Physical Sidelink Control channel (PSCCH) for control signals.

Accordingly, various aspects may be implemented with a variety of standards, such as: 4G LTE-D2D Rel-12, 4G LTE-V2X Rel-14, 4G LTE-V2X Rel-15, and 5G NR-V2X Rel-15/16. For 4G LTE-V2X Rel-14 and Rel-15, both the control channel (PSCCH) and the data channel (PSSCH) may be utilized. Further, various embodiments pertain to 3GPP Cellular V2X, such as the LTE Rel-14, LTE Rel-15 and 5G NR V2X, which may facilitate reception and further facilitate an increase of the range of a LTE-V2X receiver (e.g., from ~700 meters to ~2100 meters). Such embodiments may be carried out with a reasonable increase in signal processing complexity (e.g., 1.2 times). In certain embodiments, several fast Fourier transform (FFT) series are used to reduce the amount of inter-symbol interference (ISI) observed when a transceiver (TX) and receiver (RX) are far apart, and thus experience a significant time offset. Channel estimation duplication may partly be suppressed, by selecting one of two or more signals based on early channel estimation functions. With such an approach, more comprehensive functions such as heavy-duty equalization and channel decoding (e.g., Turbo decoding mostly) can then be carried out on the particular signal being processed. This avoids unnecessary further processing of signals not being targeted at a particular instance, such as signals from other vehicles or reflected signals from a targeted vehicle.

Various embodiments facilitate the mitigation of timing errors in LTE V2X systems. For instance, due to such timing errors, receivers may place their FFT windows at "half-CP" locations. The "half-CP" start index helps to combat possible negative time offsets (from the RX perspective). This can happen either if the transmitter is synchronized improperly "in advance", or the receiver synchronized improperly "late". If a transmitter is located further away, its message could be collected "late" by the receiver, due to the propagation time of the signal over the air, possibly creating ISI (Inter-Symbol-Interference), due to a mismatch between the TX message timing and the RX positioning window. Accordingly, various approaches as characterized herein mitigate timing errors, such as may otherwise apply in such situations, by selecting a signal and setting a decoding timing window based on the selected signal.

In more specific embodiments, data from different series of FFTs for respective signals is used to limit the amount of ISI, by focusing on a timing window for a signal to be received. For instance, a portion of channel estimation can be performed on respective FFT series, and one of the series can be selected based upon metrics indicative of ISI. A decoding timing window can then be set and used for the selected one of the FFT series. The selected FFT series is then decoded, without necessarily decoding another or other FFT series, which facilitates reception while mitigating excessive signal processing overhead.

Various aspects of the present disclosure may be implemented for vehicle communications involving LTE-V2X implementations with two types of subframes, data subframes and synchronization subframes. Data subframes convey user's data payloads, via PSCCH and PSSCH channels. The PSCCH and PSSCH can include demodulation reference signal (DMRS) symbols. DMRS provides a channel estimation pilot for demodulating the PSCCH or PSSCH. A data payload might be constructed by the MAC layer as a CAM (cooperative awareness message) or DENM (decentralized environmental notification message), and may include speed, location, heading and/or traffic information. Synchronization subframes convey the PSS, SSS (Primary & Secondary Synchronization Signal), DMRS and BCH. The PSS and SSS indicate the frame timing, for frequency & time synchronization of the V2X users. DMRS provides a channel estimation pilot for demodulating BCH. The BCH carries information about the carrier parameters, such as system bandwidth (e.g., 1.4, 3, 5, 10, 15 or 20 MHz), Frequency Division Duplex (FDD) or Time Division Duplex (TDD) modes, details such as subframe configuration and special subframe organization for the TDD mode, frame and sub-frame numbers of the BCH, PSS and SSS transmission period, and a Boolean flag indicating whether user equipment (UE) is within or outside base-station coverage.

As may be implemented in accordance with one or more embodiments, an apparatus includes an antenna circuit that receives communications in parallel from a plurality of sources, and an orthogonal frequency-division multiplexing (OFDM) receiver circuit that generates respective fast Fourier transform (FFT) series for symbols in respective ones of the received communications. The OFDM circuit performs channel estimation the respective FFT series, and selects one of the respective FFT series based upon metrics indicative of interference in the FFT series. Such metrics may, for example, be indicative of one or both of a signal to noise ratio (SNR) or a time offset estimation (TOE) for the respective FFT series. The respective FFT series may, for example, emanate from respective individual sources located at different distance, or may correspond to an original source and a reflection thereof. As such, the OFDM receiver circuit may select the FFT series corresponding to the closest one of the original sources, a target one of the original sources, or an original source relative to a reflection of the signal that it generates. The OFDM circuit further sets a decoding timing window based on the selected FFT series, and decodes the selected FFT series, with a result of the decoding being output.

In certain schemes, such as an LTE access scheme, there can be several users per subframe, and metrics such as TOE, SNR and others can be set per message (or per user). Accordingly, one of the FFT series can be selected per message, or per user, based on such metrics. Within a particular subframe, OFDM receiver may decide to use a first FFT series for a first user, and a second FFT series for a second user (and so on for additional users). This approach is useful for access schemes in which several messages are being transmitted during the same subframe, on different sets of subcarriers. Thus the metrics, gating, equalization and channel decoding may be carried out per message/per user (e.g., with the front end FFTs being common to the users).

The decoding timing window may be set in a variety of manners. In some implementations, the decoding timing window is set with an offset relative to a synchronization clock, in which the offset may further correspond to a propagation delay of the selected one of the FFT series.

In some implementations, the channel estimation is carried out using different time windows, and one of the FFT series is selected for one of the different time windows that is set as the decoding timing window. For instance, channel estimation may be carried out on each FFT series using respective time windows offset from a clock source by predefined values. Using the aforementioned metrics, a "best" one of the FFT series may be selected as a series indicating a strongest signal, relative to the selected FFT series and the other FFT series in each of the respective time windows. Such an approach may involve sweeping the time windows across a range of offset values relative to a clock to which the OFDM receiver circuit is synchronized.

In some implementations, the aforementioned OFDM receiver circuit includes respective FFT circuits, channel estimation circuits, and gating circuitry. The FFT circuits each generate one of the respective FFT series from the parallel communications received by the antenna. The respective channel estimation circuits provide channel estimation data for an FFT series received from one of the FFT circuits, and the gating circuitry receives the metrics indicative of interference from the channel estimation circuits and selects the FFT series based on the received metrics. The OFDM circuit may further include an equalizer circuit that equalizes the selected FFT series, and channel decoding circuitry that decodes the equalized selected one of the first and second FFT series.

In accordance with certain method-based embodiments, a method is carried out as follows. For communications received in parallel from a plurality of sources, respective fast Fourier transform (FFT) series are generated for symbols in respective ones of the received communications, and channel estimation is performed for each generated FFT series. For each messaged attempted to be decoded, one of the FFT series is selected based upon metrics indicative of interference in the FFT series. For instance, such metrics may include one or both of a time offset estimation (TOE) or a signal to noise ratio (SNR) of the respective FFT series. A decoding timing window is set based on the selected FFT series, and is used to decode the selected FFT series. The decoding timing window may be set with an offset relative to a synchronization clock, the timing window corresponding to a propagation delay of the selected one of the first and second FFT series. A result of the decoding is then provided as an output.

In certain implementations, the channel estimation is performed on each of the FFT series in each of different time windows, and different sets of metrics such as time offset estimation (TOE) or signal to noise ratio (SNR) are produced accordingly. The different FFT series represent various time windows across a range of offset values relative to a clock synchronization signal upon which the respective communications were transmitted.

In accordance with another embodiment, an apparatus includes respective FFT circuits that generate respective fast Fourier transform (FFT) series for symbols in respective ones of received communications. Respective channel estimation circuits provide channel estimation data for an FFT series received from one of the FFT circuits. Gating circuitry selects one of the respective FFT series based on metrics received from the respective channel estimation circuits, and timing circuitry sets a decoding timing window based on the selected one of the respective FFT series. In some implementations, the gating circuitry selects one of the respective FFT series based upon metrics including one or both of a time offset estimation (TOE) or a signal to noise ratio (SNR) of the respective FFT series. Further, the timing circuitry may set the decoding timing window by setting an offset relative to a received clock synchronization signal upon which the respective ones of the communications are received. In certain implementations, the apparatus further includes an equalizer circuit that equalizes the selected one of the respective FFT series, and channel decoding circuitry that decodes the equalized selected one of the respective FFT series.

Figure 1A:
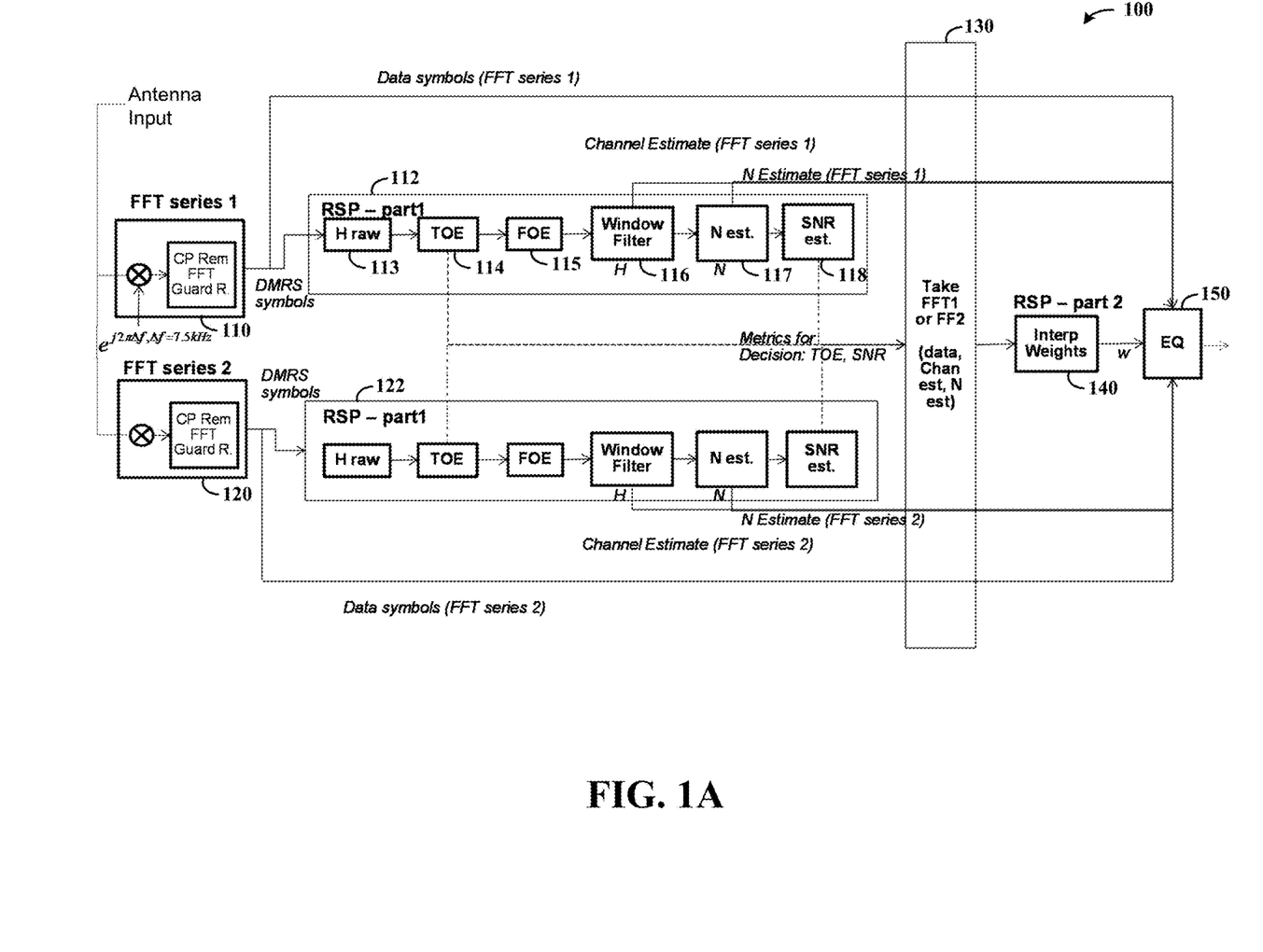
Figure 1B:
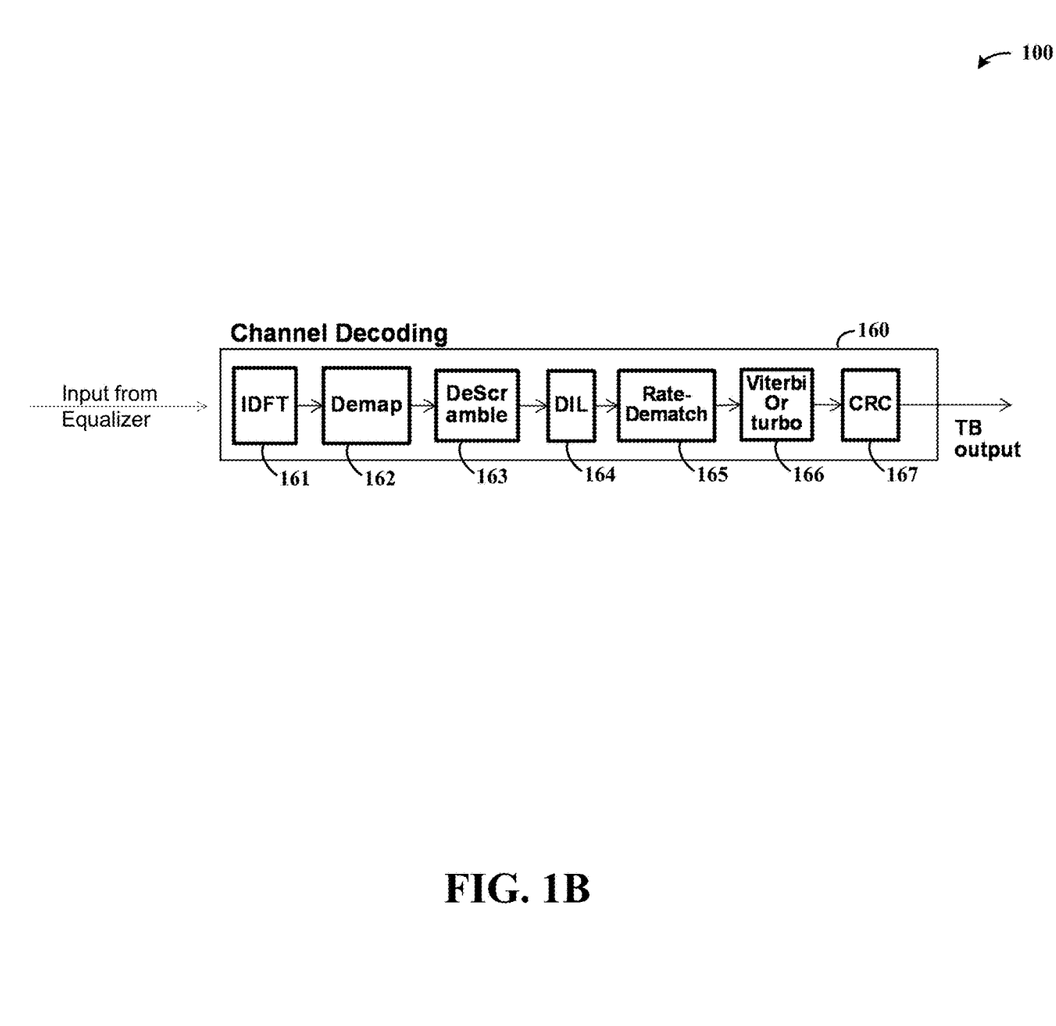

Turning now to the figures, FIGS. 1A and 1B show system 100 with exemplary circuitry and a related approach for selecting a signal upon which signal processing is based, in accordance with the present disclosure. FIG. 1A shows circuitry for selecting and processing of one of two or more received signals through an equalizer, and FIG. 1B shows further processing of the selected signal beyond the equalizer and involving channel decoding. At blocks 110 and 120, an antenna input is processed (e.g., multiplied with $e^{j2\pi\Delta f}$, $\Delta f=7.5 kHz$) to generate respective FFT series from different signal sources, such as two different original sources or an original source and a reflection thereof, with the understanding that additional such blocks may be implemented for generating FFT series from additional signal sources. Channel estimation is then carried out on DMRS symbols for each respective FFT series, at blocks 112 and 122. At block 130, one of the respective FFT series is selected (e.g., using a gating function), based on metrics provided form the channel estimation, and the selected FFT series is provided to a second signal processing step in which interpretation weights are provided at block 140, and equalization is carried out at block 150, which is provided with data symbols from the appropriate FFT series. Referring to FIG. 1B, an output of the equalizer at 150 is provided as an input to a channel decoding block 160, which decodes the FFT series and provides a decoded output therefrom.

Accordingly, blocks 110 and 120 can be implemented commonly for all users, and as such may output a large number of subcarriers (e.g., 600 subcarriers for a 10 MHz carrier size). These 600 subcarriers can be divided into several subsets pertaining to a variety of users. Subsequent blocks (112, 122, 130, 150, 160) can thus be carried out per message (or per user), on a subset of subcarriers, pertaining to a given user. Further, while the first part of the channel estimation process is carried out for each FFT series, the second part of channel estimation and the Equalizer and channel decoding functions, which may be heavier in terms of signal processing complexity, are not duplicated for each respective FFT series. This facilitates a reduction in complexity.

It is noted that, while specific channel estimation functions are represented within each of the blocks 112 and 122, a variety of channel estimation functions can be carried out, to suit particular applications. Referring to channel estimation block 112 in FIG. 1A by way of example, $H_{raw}$ block 113 may generate a vector having a raw channel estimate, time offset estimation (TOE) block 114 may carry out estimation of a time offset of the FFT series, and frequency offset estimation (FOE) block 115 may carry out estimating of a frequency offset of the FFT series. Block 116 is a window filter, which provides a channel estimate to the equalizer 150. Block 117 provides an output for an N estimate to the equalizer 150 as well. At block 118, a signal-to-noise ratio (SNR) estimate is generated.

The selection of one of the FFT series may be carried out using a variety of metrics. By way of example, dashed lines show an approach in which outputs from the TOE and/or SNR blocks 114 and 118 are used in selecting one of the FFT series. As such, either or both of these outputs may be used in this context.

Referring specifically to FIG. 1B, channel decoding as carried out at block 160 may be implemented in a variety of manners. By way of example, an inverse discrete Fourier transform (IDFT) is shown as being carried out at block 161, with subsequent symbol de-mapping (sometimes also referred to as log-likelihood-ratio (LLR) generation) at block 162 and descrambling of the signal at block 163. The descrambled signal is deinterleaved at block 164, rate-dematched at block 165, and decoded at block 166 (Viterbi or Turbo decoding shown by way of example). A cyclic redundancy check (CRC) may be performed at block 167.

In accordance with a particular embodiment, the apparatus shown in FIGS. 1A and 1B is implemented as follows. Blocks 110 and 120 are implemented as respective FFT circuits that generate respective fast Fourier transform (FFT) series for symbols in respective ones of received communications. Blocks 112 and 122 are respective channel estimation circuits that provide channel estimation data for an FFT series received from one of the FFT circuits. Block 130 is gating circuitry that selects one of the respective FFT series based on metrics received from the respective channel estimation circuits. Timing circuitry is implemented with block 160 implemented as decoding circuitry, and which sets a decoding timing window based on the selected one of the respective FFT series. In some implementations, the gating circuitry selects one of the respective FFT series based upon metrics including one or both of a time offset estimation (TOE) or a signal to noise ratio (SNR) of the respective FFT series. Further, the timing circuitry may set the decoding timing window by setting an offset relative to a received clock synchronization signal upon which the respective ones of the communications are received. In certain implementations, the block 150 is an equalizer circuit that equalizes the selected one of the respective FFT series, and channel decoding circuitry that decodes the equalized selected one of the respective FFT series.

Figure 2:
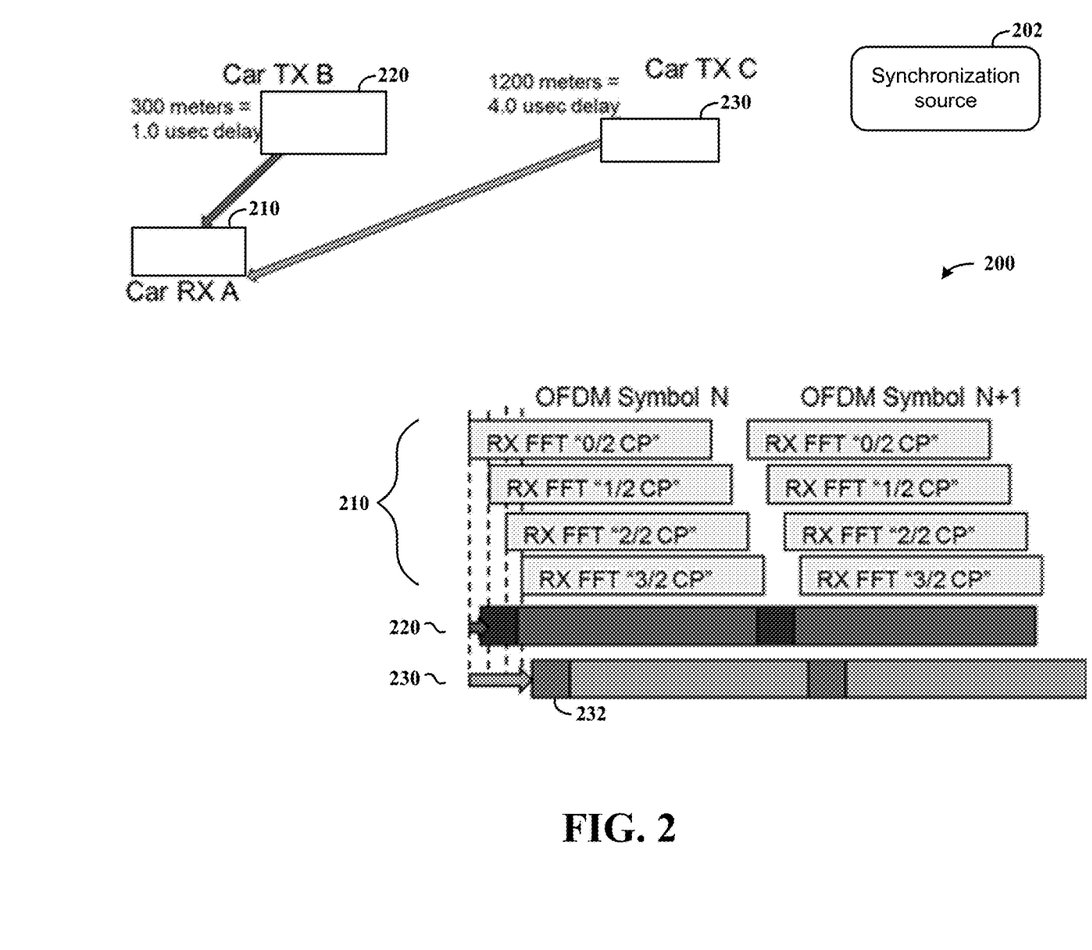
FIG. 2 shows time-based plots of a receiver and respective transmitters, as may be implemented in accordance with the present disclosure.

FIG. 2 shows time-based plots 200 of a receiver and respective transmitters, as may be implemented in accordance with the present disclosure. By way of example, a receiver 210 "A" (e.g., in a car) is shown as receiving respective transmissions from transmitters 220 "B" and 230 "C" (e.g., also cars) located respectively at 300 meters and 1200 meters away from the receiver. Each of the transmitters and the receiver are synchronized to a common clock synchronization source 202. Two OFDM symbols are shown (N and N+1), at respective time window placement options for the receiver 210, above the actual time-based position of the respective symbols as received from transmitters 220 and 230, each of which exhibit propagation delay (e.g., 1 µs and 4 µs). The first part of each transmitted symbol includes a cyclic prefix (CP, noted above), as noted by example at 232 with the symbols from transmitter 230.

Four different FFT window placement options are shown for the receiver 210, including "0/2" CP (the RX FFT window starts at the left edge of the RX CP), "1/2" CP (RX FFT window starts at the middle of the RX CP), "2/2" CP (RX FFT window starts at the right edge of the RX CP), and "3/2" CP (RX FFT window starts at the 1 and a half the edge of the RX CP). Accordingly, when signals are processed for the respective transmitters 220 and 230, the FFT window placement can be set for alignment with the transmitter 220, to facilitate reception, and the FFT series from the transmitter 220 can then be processed accordingly. For instance, the TX-RX time offset can be swept from −6 to +9 µsec, by increments of 0.5 µsec, and the decoding performance can be compared.

Figure 3:
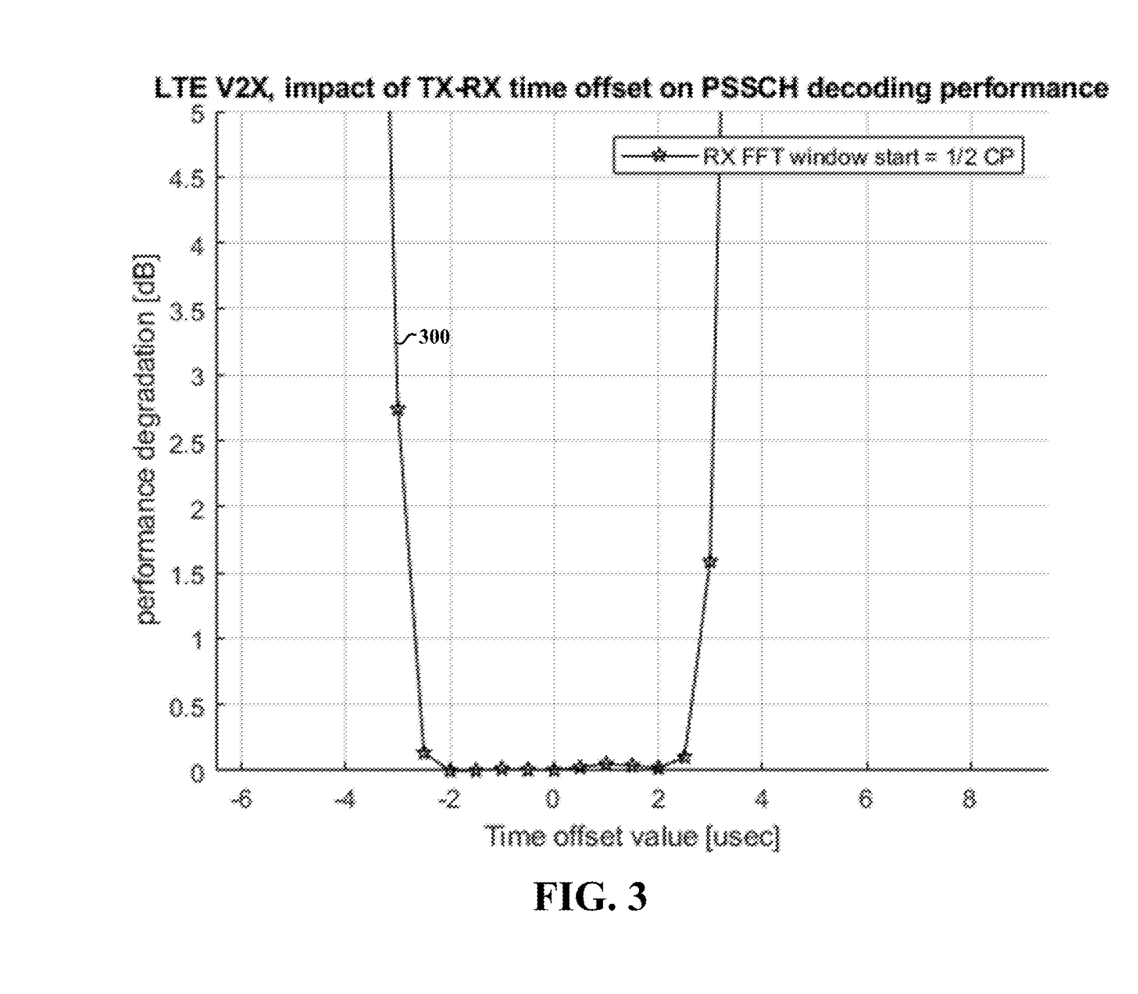
FIG. 3 shows a plot of decoding performance, as may be implemented in accordance with the present disclosure.

FIG. 3 shows a plot 300 of decoding performance, as may be implemented in accordance with the present disclosure. Performance in this context pertains to a signal-to-noise-ratio (SNR) level needed to reach a desired level, which may correspond to a given block-error-rate (BLER) level (e.g., 10% BLER or 1% BLER). Performance degradation relates to an increase in SNR required to reach a given performance (e.g., 10% BLER or 1% BLER). Performance degradation is shown on the vertical axis, with a TX-RX time offset value on the horizontal axis. By way of example, the plot is shown for a receiver FFT window start of 1/2 CP, as may be related to the embodiment characterized in FIG. 2. This FFT series performs well in the −2.5 to +2.5 μs range.

Figure 4:
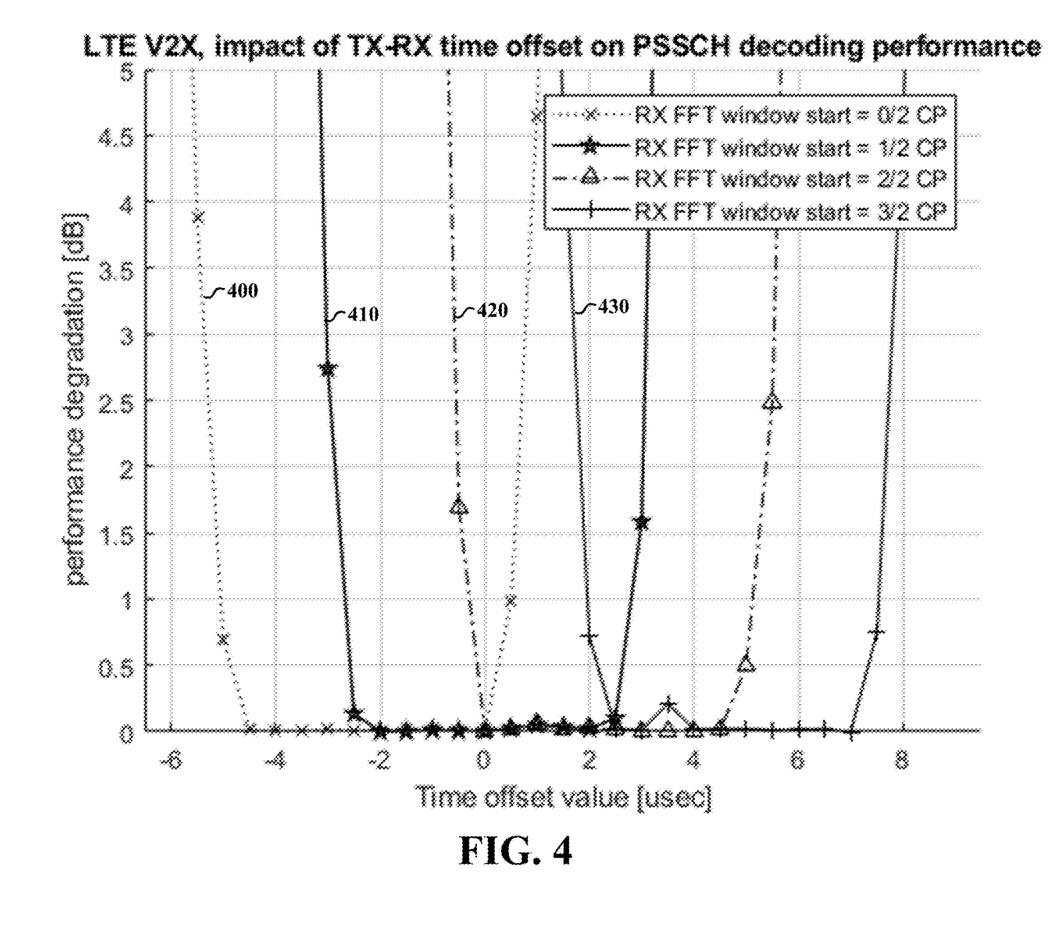
FIG. 4 shows plots of decoding performance for respective time windows, as may be implemented in accordance with one or more embodiments.

FIG. 4 shows plots of decoding performance for respective time windows, as may be implemented in accordance with one or more embodiments. As with FIG. 3, performance degradation is shown on the vertical axis, and time offset on the horizontal. Plots 400, 410, 420 and 430 respectively represent receiver FFT window starts at 0/2 CP, 1/2 CP, 2/2 CP and 3/2 CP. Shifting the FFT start to the right helps for larger (positive) time offset values, while degrading the negative time offset values.

The skilled artisan would recognize that various terminologies as used in the specification (including claims) connote a plain meaning in the art unless otherwise indicated. As examples, the specification describes and/or illustrates aspects useful for implementing the claimed disclosure by way of various circuits or circuitry which may be illustrated as or using terms such as blocks, modules, device, system, unit, controller, equalizer, decoder, estimator, and/or other circuit-type depictions (e.g., reference numerals 110, 112-118, 130, 140, 150 and 160 of FIGS. 1A and 1B depict blocks/modules as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in the figures and described herein. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described in connection with FIGS. 1A and 1B is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to transform . . . " is interpreted as "circuit configured to transform . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, certain embodiments are implemented with the portion of FIG. 1A relevant to selecting an FFT series, and which may be coupled with other embodiments/circuitry. As another example, the plots shown in FIGS. 3 and 4 may be implemented with approaches and/or circuitry shown in FIGS. 1A, 1B and 2, or with other approaches and/or circuitry. Such modifications do not depart from the true spirit and scope of various aspects of the disclosure, including aspects set forth in the claims.

What is claimed is:

1. An apparatus comprising:
   an antenna circuit configured and arranged to receive communications in parallel from a plurality of sources; and
   an orthogonal frequency-division multiplexing (OFDM) receiver circuit configured and arranged to:
      generate respective fast Fourier transform (FFT) series for symbols in respective ones of the received communications,
      perform channel estimation for a first one of the FFT series,
      perform channel estimation for a second one of the FFT series,
      select one of the first and second FFT series based upon metrics indicative of interference in the first and second ones of the FFT series,
      set a decoding timing window based on the selected FFT series, wherein the decoding timing window is set with an offset relative to a synchronization clock, the decoding timing window corresponding to a propagation delay of the selected one of the first and second FFT series, and
      decode the selected FFT series, and output a result of the decoding.

2. The apparatus of claim 1, wherein the first and second ones of the FFT series respectively correspond to an original communication from one of the sources and a reflection of the communication, and the OFDM receiver circuit is configured and arranged to select the FFT series corresponding to the original communication based on the metrics.

3. The apparatus of claim 1, wherein the OFDM receiver circuit is configured and arranged to select one of the first and second FFT series based upon one of the plurality of sources from which the FFT series is to be decoded, and metrics of the FFT series corresponding to the one of the plurality of sources.

4. The apparatus of claim 1, wherein the OFDM receiver circuit is configured and arranged to select the first FFT series or the second FFT series based on metrics indicative of one or both of: a signal to noise ratio (SNR) of the respective FFT series, and a time offset estimation (TOE) for the respective FFT series.

5. The apparatus of claim 1, wherein the OFDM receiver circuit is configured and arranged to set the decoding time window by setting an offset from a clock to which the OFDM receiver circuit is synchronized.

6. The apparatus of claim 1, wherein the OFDM receiver circuit is configured and arranged to perform the channel estimation using different time windows, and to select the one of the first and second FFT series for one of the different time windows that is set as the decoding timing window.

7. The apparatus of claim 6, wherein the OFDM receiver circuit is configured and arranged to sweep the time windows across a range of offset values relative to a clock to which the OFDM receiver circuit is synchronized.

8. The apparatus of claim 1, wherein the OFDM receiver circuit includes:

respective FFT circuits, each configured and arranged to generate one of the respective FFT series from the parallel communications received by the antenna;

respective channel estimation circuits, each configured and arranged to provide channel estimation data for an FFT series received from one of the FFT circuits; and gating circuitry configured and arranged to receive the metrics indicative of interference from the channel estimation circuits and to select the one of the first and second FFT series based on the received metrics.

9. The apparatus of claim 8, further including:

an equalizer circuit configured and arranged to equalize the selected one of the first and second FFT series; and channel decoding circuitry configured and arranged to decode the equalized selected one of the first and second FFT series.

10. A method comprising:

for communications received in parallel from a plurality of sources, generating respective fast Fourier transform (FFT) series for symbols in respective ones of the received communications;

performing channel estimation for a first one of the FFT series;

performing channel estimation for a second one of the FFT series;

selecting one of the first and second FFT series based upon metrics indicative of interference in the first and second ones of the FFT series;

setting a decoding timing window based on the selected FFT series, wherein the setting the decoding timing window includes setting a timing window with an offset relative to a synchronization clock, the timing window corresponding to a propagation delay of the selected one of the first and second FFT series; and decoding the selected FFT series, and outputting a result of the decoding.

11. The method of claim 10, wherein selecting the one of the first and second FFT series includes selecting one of the first and second FFT series based upon metrics including one or both of a time offset estimation (TOE) or a signal to noise ratio (SNR) of the respective FFT series.

12. The method of claim 10, wherein selecting one of the first and second FFT series includes selecting one of the first and second FFT series based upon one of the plurality of sources from which the FFT series is to be decoded, and metrics of the FFT series corresponding to the one of the plurality of sources.

13. The method of claim 10, wherein the steps of performing channel estimation includes performing channel estimation on each of the FFT series in each of different time windows, and selecting the one of the first and second FFT series includes selecting one of the FFT series for one of the different time windows that is set as the decoding timing window.

14. The method of claim 13, wherein the steps of performing channel estimation include sweeping the time windows across a range of offset values relative to a clock synchronization signal upon which the respective communications were transmitted.

15. An apparatus comprising:

respective FFT circuits, each configured and arranged to generate respective fast Fourier transform (FFT) series for symbols in respective ones of received communications;

respective channel estimation circuits, each configured and arranged to provide channel estimation data for an FFT series received from one of the FFT circuits;

gating circuitry configured and arranged to select one of the respective FFT series based on metrics received from the respective channel estimation circuits; and timing circuitry configured and arranged to set a decoding timing window based on the selected one of the respective FFT series, wherein the timing circuitry is further configured and arranged to set an offset relative to a received clock synchronization signal upon which the respective ones of the communications are received.

16. The apparatus of claim 15, wherein the gating circuitry is configured and arranged to select the one of the respective FFT series based upon metrics including one or both of a time offset estimation (TOE) or a signal to noise ratio (SNR) of the respective FFT series.

17. The apparatus of claim 15, further including:

an equalizer circuit configured and arranged to equalize the selected one of the respective FFT series; and channel decoding circuitry configured and arranged to decode the equalized selected one of the respective FFT series.

* * * * *